(12) United States Patent
Patapoutian et al.

(10) Patent No.: US 11,977,445 B2
(45) Date of Patent: May 7, 2024

(54) HOST-LEVEL OUTER CODES

(71) Applicant: Seagate Technology LLC, Fremont, CA (US)

(72) Inventors: Ara Patapoutian, Hopkinton, MA (US); Ryan McCallister, Erie, CO (US); Ian Davies, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/590,129

(22) Filed: Feb. 1, 2022

(65) Prior Publication Data

US 2023/0244567 A1    Aug. 3, 2023

(51) Int. Cl.
*G06F 11/10* (2006.01)
*G06F 11/00* (2006.01)
*G11C 29/52* (2006.01)

(52) U.S. Cl.
CPC .................. *G06F 11/1076* (2013.01)

(58) Field of Classification Search
CPC ............ G06F 11/1076; G06F 11/1068; G06F 11/108; G11C 29/52; G11C 2029/0411
See application file for complete search history.

(56) References Cited

U.S. PATENT DOCUMENTS

| | | | |
|---|---|---|---|
| 7,814,398 B2 | 10/2010 | Djurdjevic et al. | |
| 8,448,045 B2* | 5/2013 | Reddy | H03M 13/2909 714/764 |
| 9,213,602 B1* | 12/2015 | Alhussien | H03M 13/458 |
| 9,356,626 B2 | 5/2016 | Alexeev et al. | |
| 10,382,065 B1 | 8/2019 | Sridhara et al. | |
| 10,474,527 B1* | 11/2019 | Sun | G06F 11/1068 |
| 10,719,392 B1* | 7/2020 | Sridhara | G11B 20/10268 |
| 10,853,187 B2 | 12/2020 | Arslan et al. | |
| 11,042,439 B1* | 6/2021 | Sridhara | H03M 13/2912 |
| 2015/0372697 A1* | 12/2015 | Alhussien | G06F 11/1076 714/755 |
| 2020/0394100 A1* | 12/2020 | Basu | G06F 11/2053 |

* cited by examiner

*Primary Examiner* — Justin R Knapp
(74) *Attorney, Agent, or Firm* — Faegre Drinker Biddle & Reath LLP (57) ABSTRACT

A method includes detecting, by a first data storage device, an error when reading data from the first data storage device. The method further includes correcting a portion of the error, by a controller of a host system, using host-level outer codes; and communicating, by the controller, error correction information to the first data storage device in response to correcting the portion of the error using the host-level outer codes.

9 Claims, 6 Drawing Sheets

HOST-LEVEL OUTER CODES

SUMMARY

In certain embodiments, a method includes detecting, by a first data storage device, an error when reading data from the first data storage device. The method further includes correcting a portion of the error, by a controller of a host system, using host-level outer codes; and communicating, by the controller, error correction information to the first data storage device in response to correcting the portion of the error using the host-level outer codes.

In certain embodiments, a data storage system including a hard disk drive with circuitry configured to: detect errors within data read from a data sector, generate error-containing data associated with the detected errors, communicate the error-containing data outside the hard disk drive, receive error correction information from outside the hard disk drive, and correct the data read from the data sector with the received error correction information.

In certain embodiments, a system-on-a-chip includes an interface, and a read/write channel. The read/write channel is configured to: detect errors within data read from a data sector, generate error-containing data associated with the detected errors, communicate the error-containing data through the interface, receive error correction information from the interface, and correct the data read from the data sector with the received error correction information.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope of the appended claims.

DETAILED DESCRIPTION

To read data from magnetic recording media, hard disk drives use magnetic sensors—sometimes referred to as readers, read heads, or read transducers—to detect magnetic transitions written to the magnetic recording media (e.g., the hard disks). When processing the data detected by (or read by) the magnetic sensors, hard disk drives may detect that a read error has occurred.

To correct the detected error, hard disk drives are programmed to carry out various error-recovery approaches. One approach uses what are referred to as outer codes. Outer codes may be stored on the magnetic recording media and used by the hard disk drive to iteratively correct read errors. However, over time, the effectiveness of outer codes can decrease unless the outer codes are updated to maintain parity. This maintenance of parity consumes resources in hard disk drives which can negatively affect performance. Certain embodiments of the present disclosure are accordingly directed to methods and devices for error correction that use new approaches with outer codes.

Figure 1:
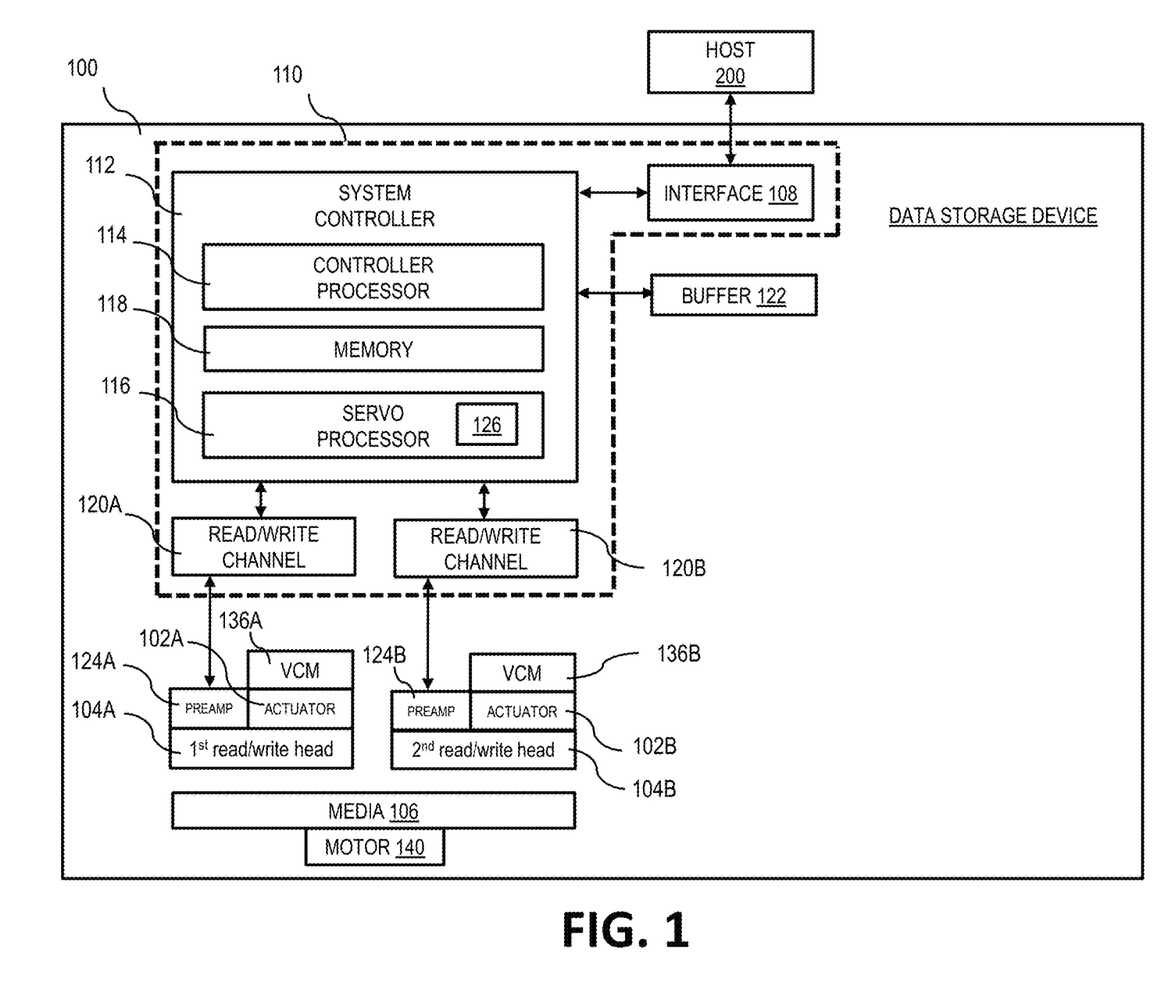
FIG. 1 shows a block diagram of a data storage device, in accordance with certain embodiments of the present disclosure.

FIG. 1 shows a schematic of a data storage device 100 such as a hard disk drive. In the case of a hard disk drive, the data storage device 100 can include multiple actuators (i.e., a first actuator 102A and a second actuator 102B) each with one or more read/write heads 104A and 104B to provide concurrent access to magnetic recording media 106 (e.g., magnetic recording disks, which are referred to as a magnetic recording medium in singular form). In certain embodiments, the multiple actuators 102A and 102B share a common pivot axis and are positioned in a stacked arrangement. In such embodiments, the read/write head(s) 104A coupled to the first actuator 102A access different surfaces of the magnetic recording media 106 than the read/write head(s) 104B coupled to the second actuator 102B. In other embodiments, the multiple actuators 102A and 102B have separate pivot axes. In such embodiments, the read/write head(s) 104A coupled to the first actuator 102A can access the same magnetic recording medium 106 as the read/write head(s) 104B coupled to the second actuator 102B. Although only two actuators for the data storage device 100 are shown in FIG. 1, additional actuators can be incorporated into the data storage device 100 or the data storage device 100 may have only one actuator. The read/write heads 104A and 104B can each comprise a slider with one or more read transducers (e.g., readers, read head, magnetic sensors) and one or more write transducers (e.g., writers, write head).

The data storage device 100 includes an interface 108 (e.g., an input/output interface) for transferring data to and from the data storage device 100. For example, the interface 108, among other features, can be communicatively coupled between a host 200 (shown in more detail in FIG. 2) and the read/write heads 104A and 104B to facilitate communication, using a standardized communication protocol (e.g., SATA, SAS, SCSI), between the read/write heads 104A and 104B and the host 200.

The data storage device 100 can include a system on a chip ("SOC") 110 (shown in dashed lines) that includes a system controller 112, which can include a controller processor 114 (e.g., a microprocessor), a servo processor 116 (e.g., a microprocessor), and memory 118 coupled to the controller processor 114 and the servo processor 116. The SOC 110 can include multiple distinct banks of memory. For example, one bank of memory 118 can be dedicated to the controller processor 114 and its functions while another bank of memory 118 can be dedicated to the servo processor 116 and its functions (e.g., the memory 118 and the servo processor 116 together functioning as a servo controller 126). The interface 108 may also be part of the SOC 110.

The SOC 110 can also include one or more read/write channels 120A and 120B, which encode and decode data associated with write commands and with read commands. The SOC 110 may be an integrated circuit such as an application-specific integrated circuit ("ASIC") and field-programmable gate array ("FPGA") that includes instructions (e.g., in the form of firmware) for carrying out various functions of the data storage device 100. For example, the SOC 110 can include circuitry to control and carry out various aspects of the data storage device 100 as described in more detail below. Although the interface 108, system controller 112, etc., are shown as being part of a single SOC, the components and their functions can be distributed among several integrated circuits. The system controller 112 can be coupled to and control access to a buffer 122, which can temporarily store data associated with read commands and write commands. The buffer 122 can be a volatile memory, such as a dynamic random access memory ("DRAM"), static random access memory ("SRAM"), or other volatile memory.

During operation, the data storage device 100 receives various data transfer commands (e.g., a read command or a write command) from the host 200. Data associated with a write command may be received from the host 200 by the interface 108 and initially stored to the buffer 122. The data is encoded or otherwise processed by respective read/write channels 120A or 120B and eventually stored to the magnetic recording media 106 via one of the read/write heads 104A or 104B coupled to the respective first actuator 102A or the second actuator 102B. Data associated with a read command may be retrieved from the magnetic recording media 106, processed by one of the read/write channels 120A or 120B, and stored in the buffer 122. Such data is then transferred to the host 200 by the interface 108. In certain embodiments, the servo processor 116 controls operations of respective pre-amplifiers 124A and 124B, which provide signals to the respective read/write heads 104A and 104B for writing magnetic transitions to the magnetic recording media 106 and for receiving signals from the respective read/write heads 104A and 104B in response to detecting magnetic transitions written to the magnetic recording media 106.

The data storage device 100 includes a servo control system 126 that is carried out by components of the system controller 112 (e.g., the servo processor 116 and one or more banks of the memory 118). The system controller 112 controls current to at least one of the voice coil motor (VCM) assemblies 136A, 136B and—for some operations—controls voltage to microactuators to position the read/write heads 104A and 104B over the desired track. The VCM assemblies 136A and 136B are used to position (e.g., rotate) the actuators 102A and 102B to position the read/write heads 104A and 104B over a desired data track on the magnetic recording media 106 for data reading and data writing operations.

Figure 2:
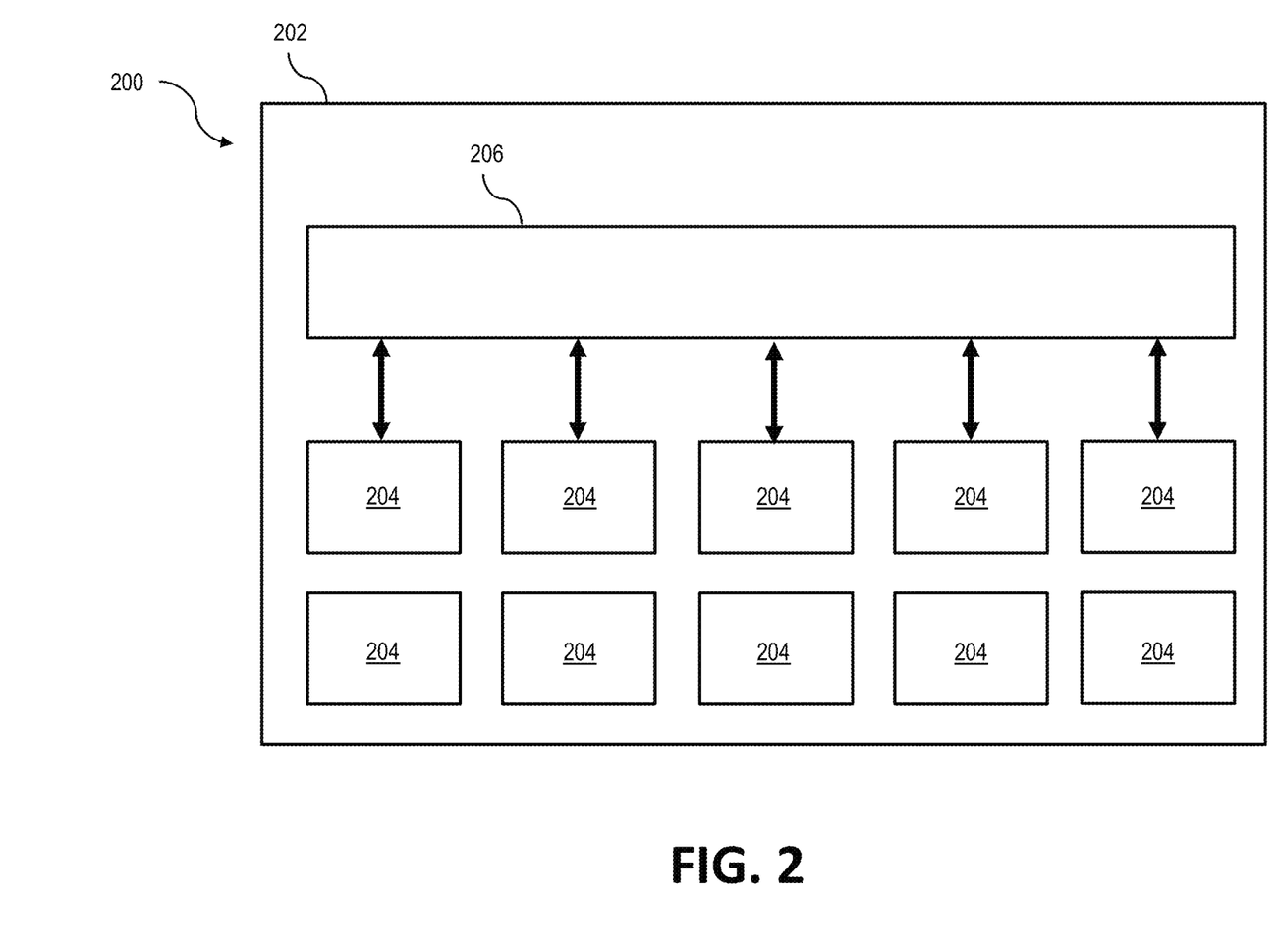
FIG. 2 shows a block diagram of a host data storage system, in accordance with certain embodiments of the present disclosure.

FIG. 2 shows a schematic of the host 200. The host 200 can be a data storage system such as a server. The host 200 can include an enclosure 202 (e.g., drawers, cabinets, and the like) that houses data storage devices 204 (e.g., hard disk drives, solid state drives, and/or optical disk drives, and the like) and other components such as power supplies, cooling devices, etc.

Each data storage device 204 can include the same or similar features as the data storage device 100 shown in FIG. 1 and described above. The particular number and types of data storage devices 204 can vary. However, for explanatory purposes, the host 200 in FIG. 2 includes ten data storage devices 204 that are hard disk drives. The host 200 also includes a host controller 206 (hereinafter, the "controller 206") that is communicatively coupled to the data storage devices 204.

Figure 3:
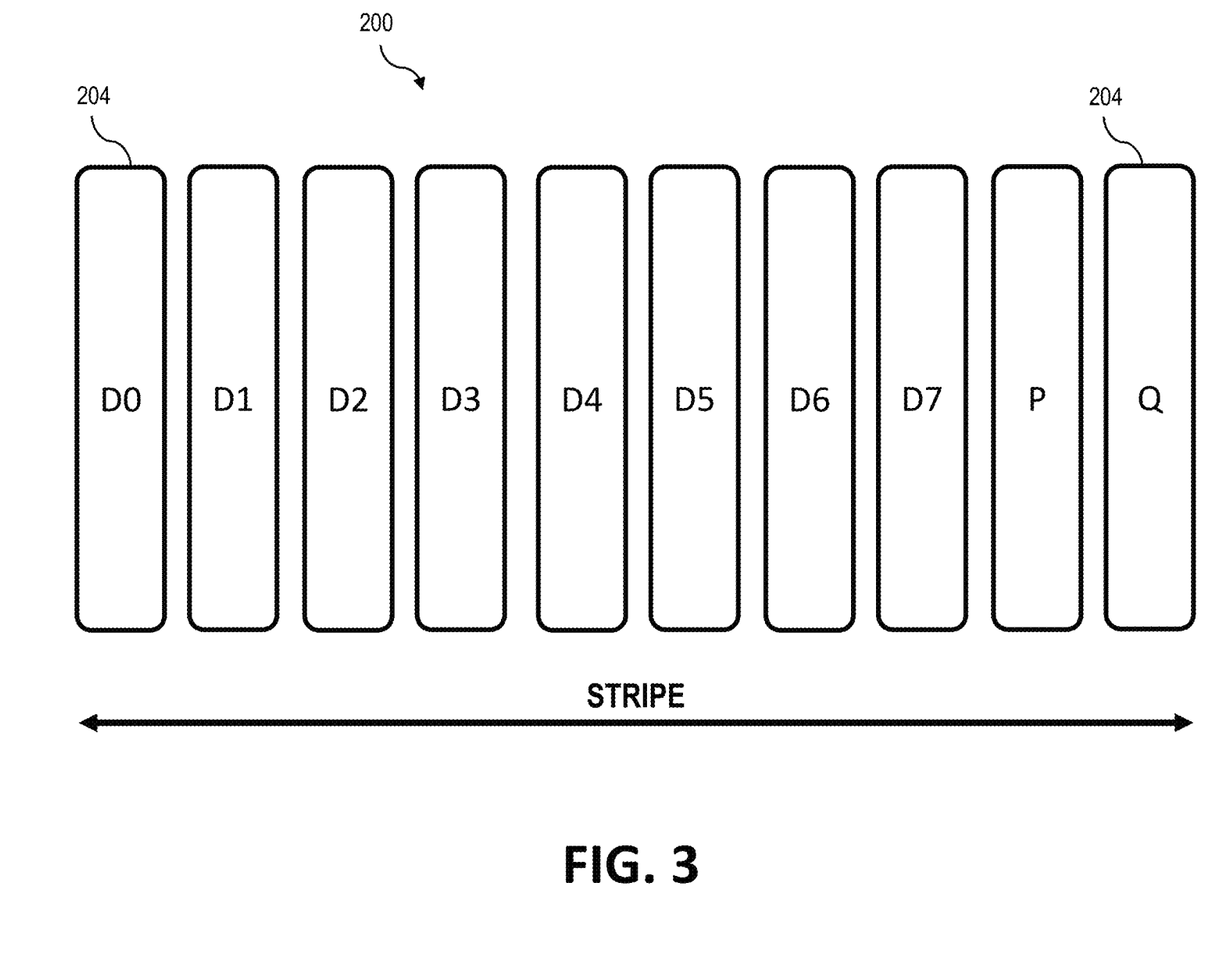
FIG. 3 shows a block diagram of data storage devices of the host of FIG. 2, in accordance with certain embodiments of the present disclosure.

FIG. 3 shows a schematic of the data storage devices 204 of the host 200. In the example of FIG. 3, the host 200 is programmed to utilize the data storage devices 204 in a RAID-6 configuration. In this configuration, eight of the data storage devices 204 are data drives (labeled D0-D7) and two are parity drives (labeled P and Q). These data storage devices 204 represent a stripe, where each stripe is made up of data storage devices 204 each with a chunk size of data. The chunk is a consecutive range of logical block addresses (LBAs)—such that the first N bytes are stored in the data storage device 204 labeled D0, the next N bytes are stored in the data storage device 204 labeled D1, and so on. In a RAID-6 configuration (and other RAID configurations), the outer code of the host 200 (e.g., the host-level code, not the device-level code) is maintained to have valid parity as new data is stored to the host 200 or modified within the host 200.

Referring back to FIG. 3, the controller 206 can include or be coupled to various computing-related components. For example, the controller 206 may include a bus that, directly and/or indirectly, couples one or more of the following devices: processor(s), memory, and input/output interface(s). In embodiments, the memory stores computer-executable instructions for causing the processor to perform aspects of embodiments described herein. The computer-executable instructions may include, for example, computer code, machine-useable instructions, and the like such as, for example, program components capable of being executed by one or more processors associated with the controller 206. Program components may be programmed using any number of different programming environments, including various languages, development kits, frameworks, and/or the like. Some or all of the functionality contemplated herein may also, or alternatively, be implemented in hardware and/or firmware. In certain embodiments, the processor, memory, and instructions are part of an application specific integrated circuit (ASIC), field-programmable gate array (FPGA), and the like.

As noted above, when read/write channels process data detected by one or more of the magnetic sensors of a read/write head, hard disk drives (e.g., the SOC) may detect that a read error has occurred. In attempting to correct the error, hard disk drives may utilize outer codes that are stored on the magnetic recording media. However, to maintain effectiveness, the outer codes should be updated when data is modified, etc., to maintain parity. Updating the outer codes typically involves reading the outer codes, then modifying the outer codes, and then overwriting the previous outer codes with the modified outer codes. This consumes processing power and time. Moreover, storing the outer codes to the magnetic recording media consumes storage capacity that otherwise could be used to store user data.

In embodiments of the present disclosure, instead of using outer codes stored on tracks on the magnetic recording media of individual data storage devices, operative outer codes are stored outside of the data storage devices. As such, a controller such as the controller 206 of the host 200—instead of the SOCs of the individual data storage devices—can use its outer codes to generate error correction information. The generated error correction information is then sent from the controller 206 to a respective data storage device, which uses the error correction information to attempt to recover previously-read data. This back-and-forth process can be repeated.

As described in more detail below, such an approach takes advantage of outer codes stored at the host-level and reduces the amount of power consumed at the device-level to process iterative outer codes. Because host-level outer codes are updated over time to maintain parity as a matter of course, the effectiveness of the host-level outer codes can be maintained without requiring individual data storage devices to spend the time and resources to rewrite their own outer codes when new data is written or when data is otherwise modified. Further, host-level outer codes are typically more robust than device-level codes because host-level codes use a higher ratio of parity sectors to non-parity sectors. As just one example, a host may include one parity sector for every five non-parity sectors whereas a data storage device may use one parity sector for every 250 non-parity sectors.

In short, the approaches described herein not only can free up storage capacity and processing bandwidth of individual data storage devices but can also increase the likelihood that errors can be corrected using host-level outer codes.

Figure 4:
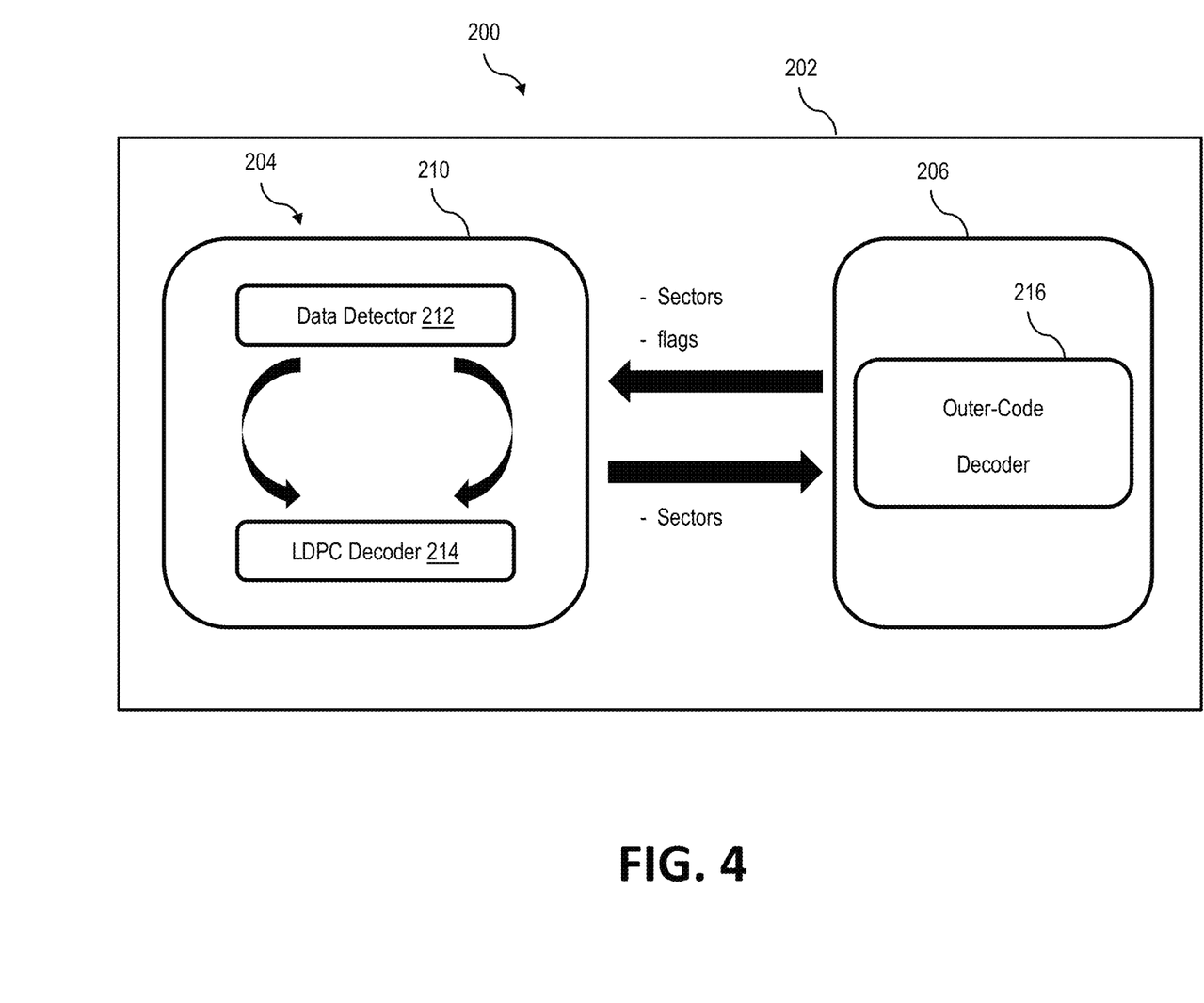
FIG. 4 shows a block diagram of one of the data storage devices and the host of FIG. 2, in accordance with certain embodiments of the present disclosure.

FIG. 4 shows a schematic of the host 200 and, for explanatory purposes, shows only one of the data storage devices 204 and the controller 206.

The data storage device 204 can include an SOC 210, which includes various processors or modules as described above with respect to the data storage device 100 of FIG. 1. In FIG. 4, the SOC 210 includes a data detector 212 and a low-density parity check (LDPC) decoder 214 (e.g., a soft decoder). Both the data detector 212 and the LDPC decoder 214 can be part of a read/write channel portion of the SOC 210 of the data storage device 204.

The data detector 212 receives the waveforms sensed by the magnetic read transducer and generates bits and associates each bit with a confidence/probability metric. The LDPC decoder 214 is an ECC decoder and—using the confidence levels and the bit decisions—attempts to correct all the bit errors that the data detector 212 generates. In certain situations when excessive bit-errors occur, the LDPC decoder 214 is not capable of correcting all the bits in the sector. When the LDPC decoder 214 fails to recover the sector (e.g., an unrecoverable read error), the data storage device 204 can initiate various data recovery processes such as attempting to re-read the data track. If the various recovery processes cannot correct the detected error (e.g., within a threshold period of time or within a threshold number of attempts), the data storage device 204 (e.g., via firmware of the SOC 210) can associate the error-containing data with a status indicating the existence of the errors. The status can indicate that the data for a given sector may not be all correct.

If the data cannot be corrected by other means (e.g., means other than outer codes such as read retries), the SOC 210 can determine that an outer code approach should be attempted. In attempting such an approach, the SOC 210 can communicate the error-containing data outside the data storage device 204 to the controller 206. In certain embodiments, the communicated error-containing data includes sector values at the symbol level to the controller 206.

The controller 206 is configured to receive the error-containing data and to attempt to generate error correction information using host-level outer codes. These outer codes can be stored in memory accessible or part of the controller 206. The outer codes can be the same codes used to correct other types of errors in the host 200. For example, the outer codes may also be considered to be the host's erasure code. More specifically, the outer codes may be Reed-Solomon error-correcting codes The controller 206 can use the host-level outer codes to generate error-correction information. The controller 206 may include an outer-code decoder 216, which attempts to correct or validate the symbols of the error-containing data. For example, the outer-code decoder 216 of the controller 206 can use the host-level outer code to correct or validate certain symbols representing sectors of error-containing data. Those corrected or validated symbols can then be pinned (e.g., to a high reliability value such as a log likelihood ratio (LLR)) and communicated back to the respective data storage device 204. In pinning the corrected/validated symbols, the controller 206 can communicate a mask or flag to the respective data storage device 204. In certain embodiments, the masks or flags are in the form of a log sense type command or a bitmap that identifies which symbols are valid or likely to be valid (and the respective locations of such symbols).

The LDPC decoder 214 can use the error-correction information to correct the error-containing data such that the full packet of requested data can be communicated to the device that initiated the read command. Put another way, the corrected and/or validated symbols from the controller 206 can be incorporated with the data previously available at the LDPC decoder 214.

The process described above can be repeated multiple times. For example, after the LDPC 214 receives the error-correction information, the LDPC 214 can send the (now smaller set of) uncorrected data back to the controller 206. The controller 206 can then attempt to pin additional symbols and send them to the LDPC 214, which can use the pinned symbols to recover additional sectors of data. In certain embodiments, the process will be repeated until a threshold number of sectors are recovered, until the process is attempted a certain number of times, or until an iteration does not result in any additional pinned symbols. Once the process stops iterative, the combined read and recovered packet of data can be communicated outside the data storage device 204.

Figure 5:
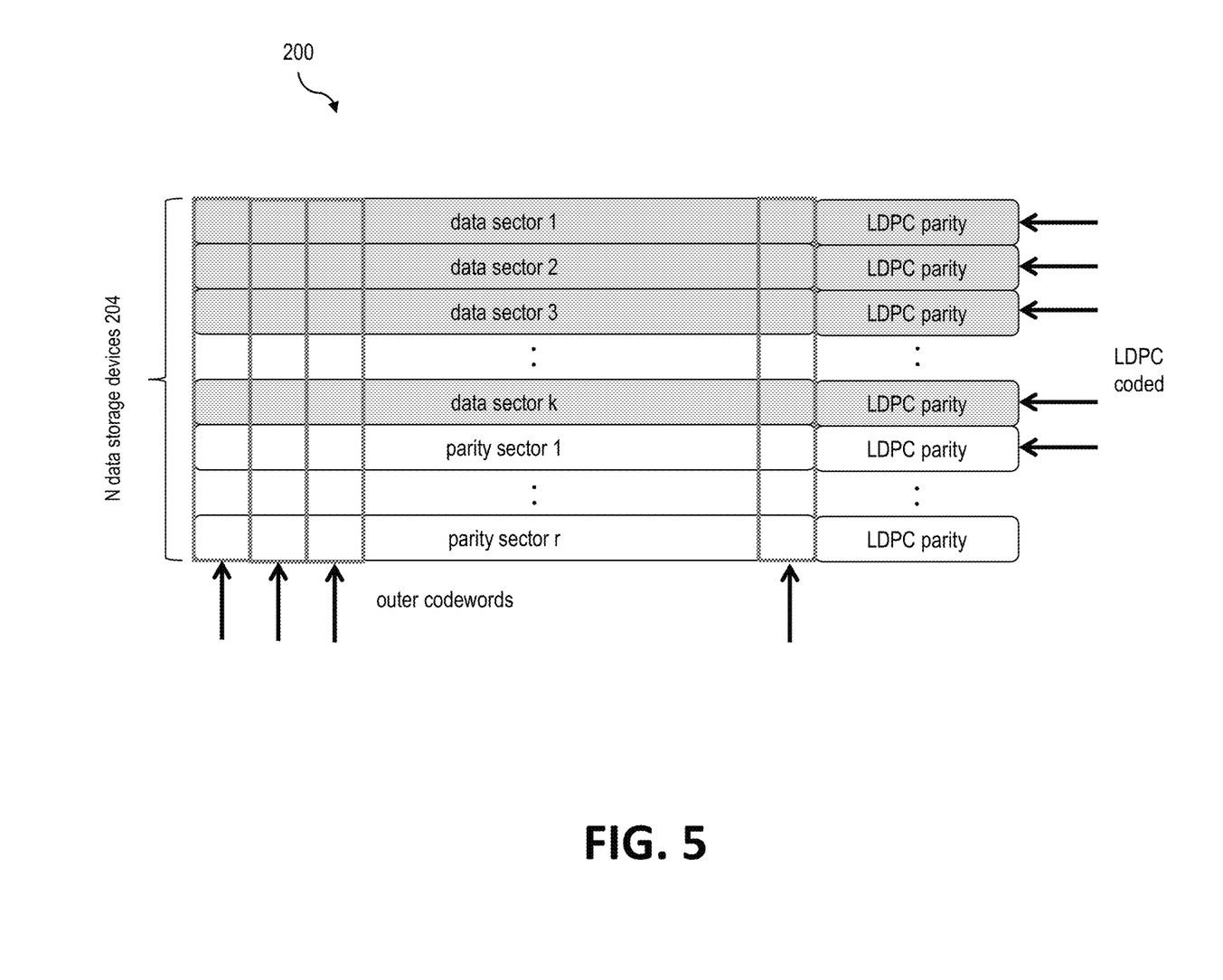
FIG. 5 shows a schematic representation of an error correction approach managed by the host of FIG. 2, in accordance with certain embodiments of the present disclosure.

To visually depict the host-level error correction approach described above in a different way, FIG. 5 shows a schematic representation of the host-level error correction approach. Each row in the schematic of FIG. 5 represents a different data sector from a different data storage device 204.

After reading data from a magnetic recording medium, one of the data storage devices 204 may attempt—among other things—to use its LDPC decoder 214 to process (e.g., decode) and correct the data from the magnetic recording media. However, the number or extent of detected errors in the read data may exceed the capability of the LDPC decoder 214 to reliably correct each of the errors. As such, sectors associated with the uncorrected errors can be collected and communicated to the controller 206 of the host 200.

As noted above, the controller 206 can use the host-level outer code to correct and/or validate the previously uncorrected errors. Information about these corrected and/or validated data can be sent back to the data storage device 204 for incorporation with the data successfully decoded previously. In the example of FIG. 5, the host-level outer code is used to correct and/or validate symbols along the vertical direction while the device-level LDPC code is used to correct and/or validate symbols along the horizontal direction. Therefore, the two approaches are complementary.

To help facilitate communications between data storage devices 204 and the host 200 are described above, certain features of the data storage device 204 and/or the host 200 can be modified or disabled. One example includes encryption and another example includes modulation code.

For encryption, if the information being passed between the data storage devices 204 and the host 200 is encrypted, it can be challenging to quickly carry out the approaches described above. This is because encryption causes error propagation. The SOC 210 can be programmed such that—when error-containing data is communicated to the host 200 (e.g., by associating such data with a status or flag)—that data can pass through any encryption modules and be left unencrypted when it is sent to the host 200.

For modulation codes, some codes will amplify errors if data is processed using the codes. For example, approaches that minimize error propagation such as bit insertion or bit flipping may amplify errors if the error-containing data is subjected to such approaches. The SOC 210 can be programmed such that—when error-containing data is communicated to the host 200—that data can pass through modulation codes without being subjected to approaches that would amplify errors.

Figure 6:
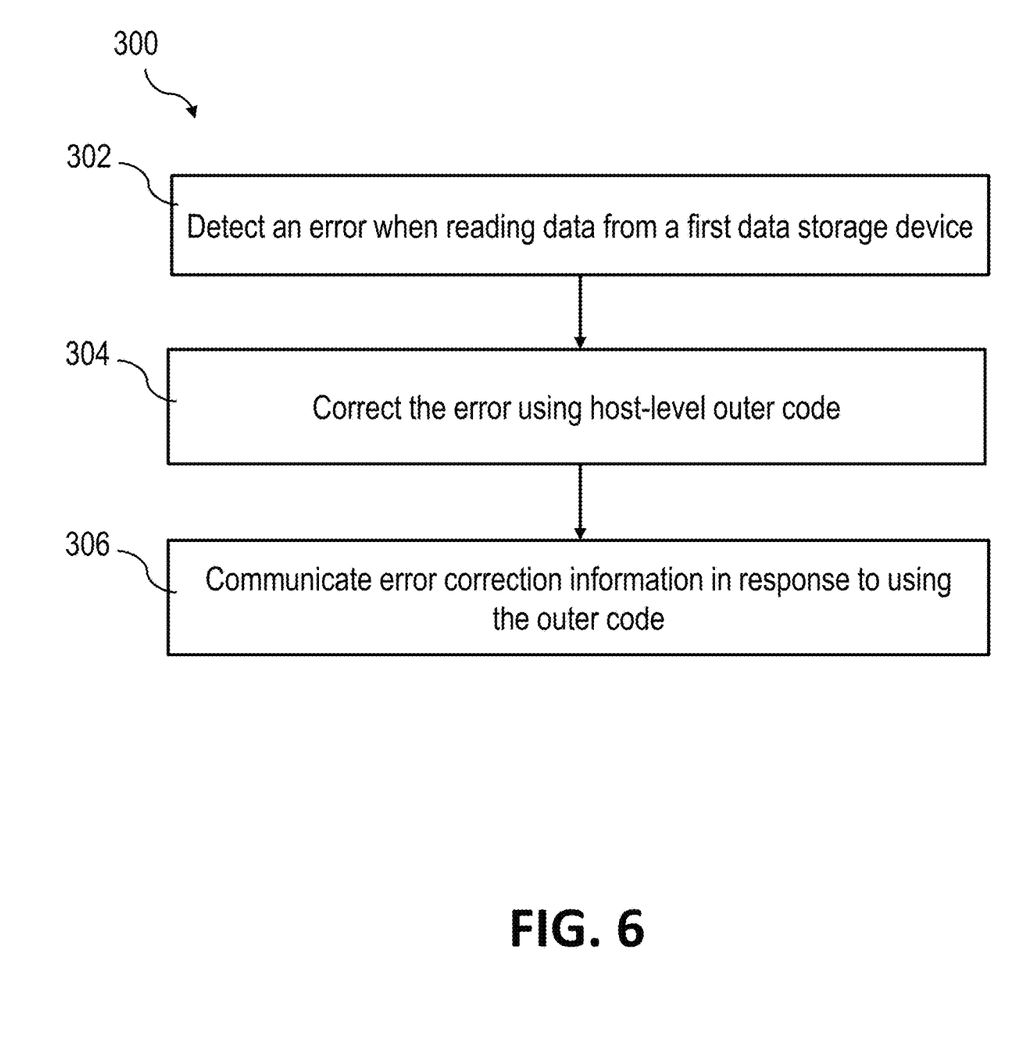
FIG. 6 shows a block diagram of an error correction method, in accordance with certain embodiments of the present disclosure.

FIG. 6 shows a block diagram of a method 300 for correcting errors of a data storage device. The method 300 includes detecting, by the data storage device, an error when reading data from the data storage device (block 302 in FIG. 6). The method 300 further includes correcting at least a portion of the error, by a controller of a host system, using outer code (block 304 in FIG. 6). The method 300 also includes communicating, by the second controller, error correction information to the first controller in response to correcting the at least the portion of the error using the outer code (block 306 in FIG. 6).

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A method comprising:
   detecting, by a first data storage device, an error when reading data from a data sector of the first data storage device;
   communicating error-containing data associated with the data sector to a controller of a host system after the detecting the error;
   correcting a portion of the error, by the controller, using host-level outer codes; and
   communicating, by the controller, error correction information to the first data storage device in response to the correcting the portion of the error using the host-level outer codes.

2. The method of claim 1, wherein the error-containing data includes symbols representative of sector values.

3. The method of claim 2, wherein the correcting the error comprises validating and/or correcting the symbols using the host-level outer codes.

4. The method of claim 3, wherein the error correction information comprises the validated and/or corrected symbols.

5. The method of claim 4, wherein a low-density parity check decoder of the first data storage device receives and processes the error correction information.

6. The method of claim 1, wherein the host-level outer codes are Reed Solomon codes.

7. The method of claim 1, wherein the host-level outer codes are erasure codes.

8. The method of claim 1, further comprising:
   detecting, by a second data storage device, a second error when reading data from the second data storage device;
   correcting the second error, by the controller of the host system, using the host-level outer codes; and
   communicating, by the controller, second error correction information to the second data storage device in response to correcting the second error using the host-level outer codes.

9. The method of claim 1, further comprising:
   after the communicating error correction information to the first data storage device, correcting another portion of the error, by the controller of the host system, using the host-level outer codes; and
   communicating updated error correction information to the first data storage device based at least in part on the corrected another portion of the error.

* * * * *